Figure 1:
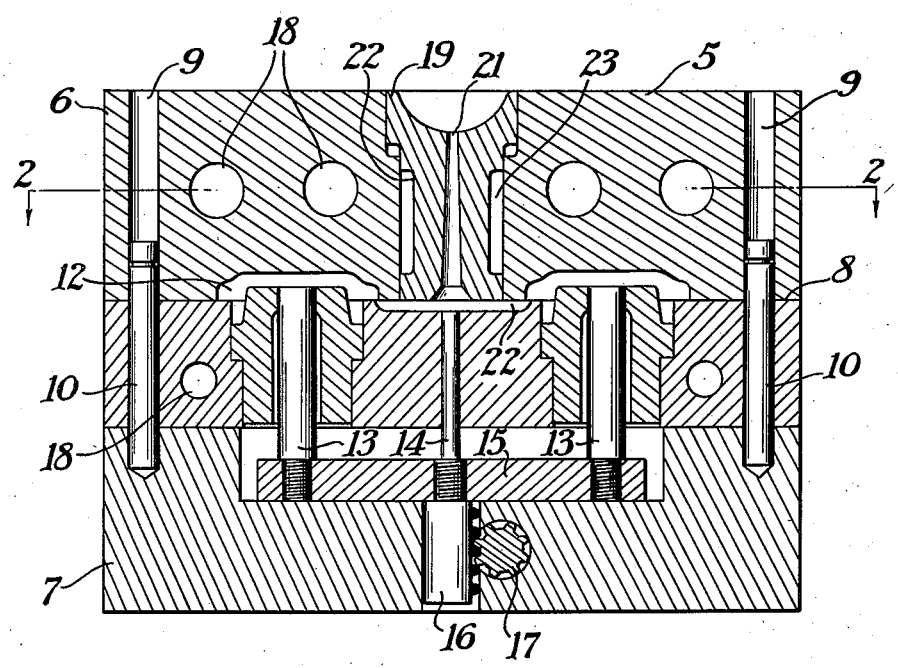

Jan. 7, 1941.   H. T. EMSLEY   2,227,966
INJECTION TYPE MOLD
Filed April 21, 1938

HOWARD T. EMSLEY
INVENTOR

BY *N. M. Perrins*
*Daniel J. Mayne*
ATTORNEYS

Patented Jan. 7, 1941

2,227,966

UNITED STATES PATENT OFFICE 2,227,966

INJECTION TYPE MOLD

Howard T. Emsley, Kingsport, Tenn., assignor to Eastman Kodak Company, Rochester, N. Y., a corporation of New Jersey Application April 21, 1938, Serial No. 203,376

1 Claim. (Cl. 18—34)

This invention relates to injection molding apparatus for thermoplastic compositions and more particularly to an improved injection mold having means for preventing rapid cooling of the thermoplastic composition in the mold gate and runners.

In the injection molding of thermoplastic materials, it is customary to maintain the injection mold cold during the complete molding cycle, so that the heated thermoplastic material will be quickly cooled. This, of course, cools the thermoplastic material in the gate and runners of the mold, as well as the composition in the mold cavities in which the molded article is formed. In general, a relatively small gate is desirable, since this reduces the amount of scrap material which is formed on each injection operation and permits more of the composition to go into salable production. In order to form a perfect molded article in the cold mold cavity, it is necessary to maintain substantially the same pressure on the article being cooled as is exerted by the injection plunger on the material in the pressure cylinder. However, it has been found if the gate is of small cross section, and the section of the molded piece relatively large, the gate tends to freeze first and thus prevent the transmission of pressure from the pressure cylinder thru the material in the gate to that in the mold, as well as preventing additional material from flowing into the mold to compensate for the contraction due to sudden cooling. The maintenance of such pressure during the hardening is essential to prevent shrinkage in the molded piece. Heretofore, increasing the size of the gate and runners, particularly at the entrance to the cavity, was about the only means of overcoming this difficulty.

An object of the present invention is, therefore, an improved mold construction whereby cooling of the thermoplastic composition in the gate and/or runners is substantially retarded until after the article in the mold cavity is hardened.

In accordance with the invention, this and other objects are attained by constructing the mold with a dead air chamber around the gate bushing. The dead air space insulates the gate from the cold mold and retards cooling of the material in the gate until the composition in the mold cavity has hardened into the desired shape. Consequently, the injection pressure can be maintained on the composition being cooled in the mold cavity and additional composition can be forced into the mold to compensate for the contraction of the mass due to cooling. In this way, an article corresponding to the shape of the mold can be easily formed.

Figure 2:
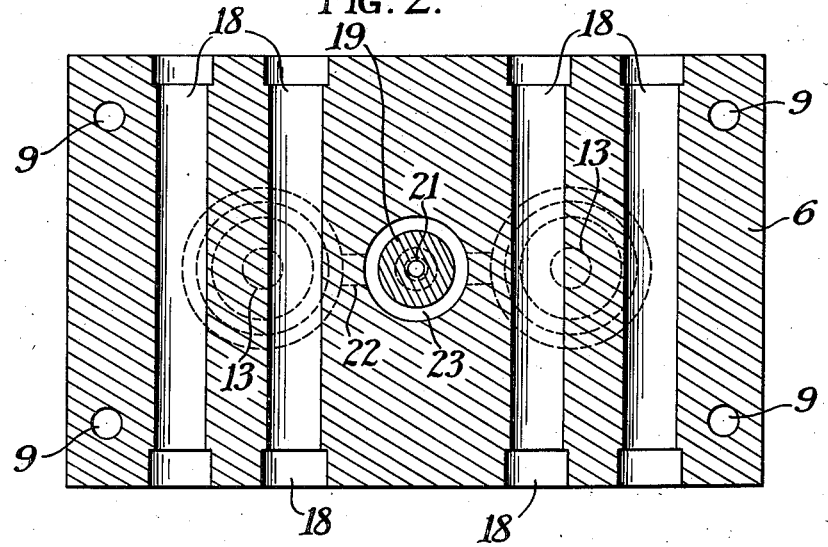

The invention will be more clearly understood by reference to the following detailed description and accompanying drawing, in which:

Fig. 1 is a sectional view in elevation of a typical injection mold with the dead air chamber associated with the gate, and Fig. 2 is a plan view of the improved mold taken on the line 2—2 of Fig. 1.

Referring to Fig. 1, there is shown an injection mold 5, comprising an upper section 6 and a lower section 7, the horizontal mold parting line being at 8. The mold sections are designed to be moved in a vertical direction toward and away from each other by any suitable means not shown in the drawing. Proper coincidence of the mold sections is assured by the engagement of guide pins 10, which are mounted in the lower mold section 7, with the slots 11 positioned in the upper mold section 6.

The mold cavity 12 is positioned on the parting line of the mold. The molded article is ejected from the mold after the mold is opened by the ejector pins 13 and 14, which are operated by ejector bar 15, which in turn is actuated by rack 16 and gear 17. The mold sections contain a plurality of cooling channels 18, through which a suitable cooling fluid, such as cold water, is continuously passed during the molding operation, the connecting pipes not being shown.

The improved gate structure is mounted in the upper mold section 6 and comprises a gate bushing 19 having a tapering gate 21 passing therethrough and connecting with the runners 22. The bushing 19 fits tightly in the upper mold section 6 and adjacent its central portion the bushing 19 is grooved at 22, thereby forming a dead air space 23 between the bushing and the mold block 6. The relation of the dead air space and the cooling channels is also shown in Fig. 2, which is a plan view of the sections on the line 2—2 of Fig. 1. It will be evident that the cooling of the round bushing 19 by the cooling channels 18 will be considerably retarded by the dead air space 23. The mass of the insulated gate bushing 19 is sufficient to retain the heat of the charge long enough to permit the composition to harden in the cooling mold cavities before it hardens in the gate and, owing to the dead air space insulation, the temperature of the bushing will be maintained at a relatively higher temperature than the corresponding mold cavity.

While I have found that the employment of a dead air chamber around the gate bushing prevents the thermoplastic composition from hardening in the gate before it hardens in the cavity, with the result that substantially the same pressure can be exerted on the composition in the mold as on the composition in the pressure cylinder. I may also construct similar dead air spaces around the runners leading from the gate to the mold cavities. This may be desirable in the event the article being molded is of relatively large size, in which case the material in the runners, as well as the gate, may tend to freeze sooner than the large mass in the mold cavity.

As indicated above, my invention permits the employment of smaller gates and runners with the consequent reduction in amount of scrap material formed therein. This is a considerable saving in material and handling over a given period of operation. Furthermore, owing to the soft material in the gate, additional material can be forced into the mold under the operating pressure to compensate for cooling effects and a well defined molded article can be formed.

What I claim is:

An injection mold for the injection molding of organic thermoplastic compositions comprising two halves, one being an ejector half and the other being a cover half, a mold cavity formed partly in each half, a gate within the cover half of the mold for conducting heated thermoplastic material to the cavity, the walls of said gate, intermediate its ends, being spaced from the cover half to provide a wholly enclosed air space surrounding a substantial portion of the gate, channels within said mold halves adjacent the mold cavity and gate for conducting cooling fluids to cool the thermoplastic material in the mold and gate, said air space being positioned between the gate and the adjacent cooling channels to retard the cooling of the thermoplastic material in the gate without retarding the cooling of the thermoplastic material in the mold cavity.

HOWARD T. EMSLEY.